United States Patent
Wang (10) Patent No.: US 11,877,330 B2
(45) Date of Patent: Jan. 16, 2024

(54) METHODS AND DEVICES FOR SIDELINK COMMUNICATION

(71) Applicant: NEC CORPORATION, Tokyo (JP)

(72) Inventor: Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 413 days.

(21) Appl. No.: 17/312,981

(22) PCT Filed: Dec. 14, 2018

(86) PCT No.: PCT/CN2018/121099
§ 371 (c)(1),
(2) Date: Jun. 11, 2021

(87) PCT Pub. No.: WO2020/118657
PCT Pub. Date: Jun. 18, 2020

(65) Prior Publication Data
US 2022/0046734 A1 Feb. 10, 2022

(51) Int. Cl.
*H04W 76/14* (2018.01)
*H04L 1/1812* (2023.01)
(Continued)

(52) U.S. Cl.
CPC ............ *H04W 76/14* (2018.02); *H04L 1/1812* (2013.01); *H04W 4/40* (2018.02); *H04W 92/18* (2013.01)

(58) Field of Classification Search
CPC ....... H04W 76/14; H04W 4/40; H04W 92/18; H04L 1/1812
(Continued)

(56) References Cited

U.S. PATENT DOCUMENTS 9,386,524 B2 * 7/2016 Feuersaenger .......... H04L 5/001
2014/0185495 A1 * 7/2014 Kuchibhotla ......... H04W 76/14
370/329
(Continued)

FOREIGN PATENT DOCUMENTS

| WO | 2013/154326 A1 | 10/2013 |
| WO | 2015/020473 A1 | 2/2015 |
| WO | 2018/064477 A1 | 4/2018 |

OTHER PUBLICATIONS

"Support of unicast, groupcast and broadcast in NR sidelink", Catt, 3GPP Tsg RAN1 Meeting #94bis, R1-1810539, Oct. 8-12, 2018, 9 pages, Chengdu, China.
(Continued)

*Primary Examiner* — Nghi H Ly
(74) *Attorney, Agent, or Firm* — Sughrue Mion, PLLC (57) ABSTRACT

Embodiments of the present disclosure relate to methods, devices and computer readable mediums for sidelink communication. The method comprises receiving, at a first terminal device and from a second terminal device, an indication whether a link identification field is to be included in sidelink control information. The method further comprises in response to a determination that the indication indicates that the link identification field is not to be included in the sidelink control information, transmitting, to the second terminal device, first sidelink control information via a sidelink between the first terminal device and the second terminal device, the first sidelink control information including a device identification of the second terminal device, and receiving, from the second terminal device, a first HARQ feedback for the first sidelink control information, the first HARQ feedback including the device identification.

13 Claims, 8 Drawing Sheets

(51) Int. Cl.
*H04W 4/40* (2018.01)
*H04W 92/18* (2009.01)

(58) Field of Classification Search
USPC ........ 370/310, 328, 329, 338, 341, 345, 350
See application file for complete search history.

(56) References Cited

U.S. PATENT DOCUMENTS

| | | |
|---|---|---|
| 2018/0014345 A1 | 1/2018 | Sartori et al. |
| 2018/0020454 A1* | 1/2018 | Lim .................. H04W 72/0466 |
| 2018/0270880 A1* | 9/2018 | Hosseini ............... H04L 1/0009 |

OTHER PUBLICATIONS

"Physical Layer Procedures for NR V2X Sidelink Communication", Intel Corporation, 3GPP TSG RAN WG1 Meeting #95, R1-1812489, Nov. 12-16, 2018, pp. 1-12, Spokane, USA.
International Search Report for PCT/CN2018/121099 dated Jun. 4, 2019 (PCT/ISA/210).
Written Opinion for PCT/CN2018/121099 dated Jun. 4, 2019 (PCT/ISA/237).

* cited by examiner

METHODS AND DEVICES FOR SIDELINK COMMUNICATION

CROSS REFERENCE TO RELATED APPLICATIONS

This application is a National Stage of International Application No. PCT/CN2018/121099 filed Dec. 14, 2018.

TECHNICAL FIELD

Embodiments of the present disclosure generally relate to the field of telecommunication, and in particular, to methods, devices and computer readable mediums for sidelink communication.

BACKGROUND

Device to device (D2D) communication has been developed for years and have been extended to include vehicle-to-everything (V2X) communication. For example, in current telecommunication specifications such as the 3rd Generation Partnership Project (3GPP) specification Release 14, the extensions for the D2D work consist of support of V2X communication. V2X communication includes any combination of direct communication between vehicles, pedestrians, infrastructures, and networks, and thus can be divided into the following four different types: Vehicle-to-Vehicle (V2V), Vehicle-to-Pedestrian (V2P), Vehicle-to-Infrastructure (V2I), Vehicle-to-Network (V2N). V2V communication includes communication between vehicles; V2P communication includes communication between a vehicle and a device carried by an individual (for example, a handheld user terminal carried by a pedestrian, cyclist, driver, or passenger); V2I communication includes communication between a vehicle and infrastructures supporting V2X applications, such as roadside units (RSUs) which are transportation infrastructure entities; and V2N communication includes communication between a vehicle and network infrastructures such as a network terminal.

In V2X communication, a transmitting terminal device may transmit sidelink control information (SCI) to a receiving terminal device on a sidelink control channel. The SCI may include information to which terminal device the SCI is intended. Upon receiving the SCI, the receiving terminal device receives and decodes the data based on the SCI. Based on the result of the decoding, the receiving terminal device transmits a Hybrid Automatic Repeat Request (HARQ) feedback to transmitting terminal device on a sidelink feedback channel. What kind of information should be conveyed in the SCI and HARQ feedback still needs to be discussed.

SUMMARY

In general, example embodiments of the present disclosure provide methods, devices and computer readable mediums for sidelink communication.

In a first aspect, a method for communications is provided. The method comprises receiving, at a first terminal device and from a second terminal device, an indication whether a link identification field is to be included in sidelink control information. The method further comprises in response to a determination that the indication indicates that the link identification field is not to be included in the sidelink control information, transmitting, to the second terminal device, first sidelink control information via a sidelink between the first terminal device and the second terminal device, the first sidelink control information including a device identification of the second terminal device, and receiving, from the second terminal device, a first Hybrid Automatic Repeat Request, HARQ, feedback for the first sidelink control information, the first HARQ feedback including the device identification.

In some embodiments, the method further comprises: in response to a determination that the indication indicates that the link identification field is to be included in the sidelink control information, transmitting second sidelink control information to the second terminal device via the sidelink, the second sidelink control information including a link identification of the sidelink in the link identification field and the device identification of the second terminal device, the link identification being different from the device identification, and receiving, from the second terminal device, a second HARQ feedback for the second sidelink control information, the second HARQ feedback including the link identification and the device identification of the second terminal device.

In some embodiments, the link identification comprises a first device identification of the first terminal device.

In some embodiments, the method further comprises: receiving the link identification from the second terminal device, the link identification being different from a first device identification of the first terminal device.

In some embodiments, the link identification in the second sidelink control information comprises the received link identification.

In some embodiments, a length of the link identification in the second sidelink control information is specified, configured or preconfigured.

In a second aspect, a method for communications is provided. The method comprises receiving, at a first terminal device, a link identification of a sidelink from a second terminal device, the sidelink being between the first terminal device and the second terminal device. The method further comprises transmitting, to the second terminal device, sidelink control information including the link identification and a device identification of the second terminal device; and receiving, from the second terminal device, a Hybrid Automatic Repeat Request, HARQ, feedback for the sidelink control information, the HARQ feedback including the link identification and the device identification.

In some embodiments, a length of the link identification is specified, configured or preconfigured.

In a third aspect, a method for communications is provided. The method comprises determining, at a first terminal device, whether a first sidelink between the first terminal device and a second terminal device has been established. The method further comprises in response to the determination that the first sidelink has not been established, transmitting, to a third terminal device, an indication that a link identification field is not to be included in sidelink control information, receiving, from the third terminal device, first sidelink control information via a second sidelink between the first terminal device and the third terminal device, the first sidelink control information including a first device identification of the first terminal device, and transmitting, to the third terminal device, a first Hybrid Automatic Repeat Request, HARQ, feedback for the first sidelink control information, the first HARQ feedback including the first device identification.

In some embodiments, the method further comprises: in response to the determination that the first sidelink has been established, transmitting, to the third terminal device, an indication that the link identification field is to be included in the sidelink control information, receiving, from the third terminal device, second sidelink control information via the second sidelink, the second sidelink control information including a link identification of the second sidelink in the link identification field and the first device identification, the link identification being different from the first device identification, and transmitting, to the third terminal device, a second HARQ feedback for the second sidelink control information, the second HARQ feedback including the link identification and the first device identification.

In some embodiments, the link identification comprises: a third device identification of the third terminal device.

In some embodiments, the method further comprises: determining the link identification that is different from a third device identification of the third terminal device; and transmitting the determined link identification to the third terminal device.

In some embodiments, the link identification comprises the determined link identification.

In a fourth aspect, a method for communications is provided. The method comprises determining, at a first terminal device, a link identification of a sidelink between the first terminal device and a second terminal device. The method further comprises transmitting the determined link identification to the second terminal device. The method further comprises receiving, from the second terminal device, sidelink control information including the determined link identification and a first device identification of the first terminal device. The method further comprises transmitting, to the second terminal device, a Hybrid Automatic Repeat Request, HARQ, feedback for the sidelink control information, the HARQ feedback including the determined link identification and the first device identification.

In some embodiments, determining the link identification comprises: determining the link identification having a specified, configured, or preconfigured length.

In a fifth aspect, a terminal device is provided. The terminal device comprises at least one processor and at least one memory including computer program code. The at least one memory and the computer program code are configured to, with the at least one processor, cause the terminal device to carry out the method according to the first aspect.

In a sixth aspect, a terminal device is provided. The terminal device comprises at least one processor and at least one memory including computer program code. The at least one memory and the computer program code are configured to, with the at least one processor, cause the terminal device to carry out the method according to the second aspect.

In a seventh aspect, a terminal device is provided. The terminal device comprises at least one processor and at least one memory including computer program code. The at least one memory and the computer program code are configured to, with the at least one processor, cause the terminal device to carry out the method according to the third aspect.

In an eighth aspect, a terminal device is provided. The terminal device comprises at least one processor and at least one memory including computer program code. The at least one memory and the computer program code are configured to, with the at least one processor, cause the terminal device to carry out the method according to the fourth aspect.

In a ninth aspect, there is provided a computer-readable medium storing a computer program thereon. The computer program, when executed by a processor, causes the processor to carry out the method according to the first aspect.

In a tenth aspect, there is provided a computer-readable medium storing a computer program thereon. The computer program, when executed by a processor, causes the processor to carry out the method according to the second aspect.

In an eleventh aspect, there is provided a computer-readable medium storing a computer program thereon. The computer program, when executed by a processor, causes the processor to carry out the method according to the third aspect.

In a twelfth aspect, there is provided a computer-readable medium storing a computer program thereon. The computer program, when executed by a processor, causes the processor to carry out the method according to the fourth aspect.

Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "network device" or "base station" (BS) refers to a device which is capable of providing or hosting a cell or coverage where terminal devices can communicate. Examples of a network device include, but not limited to, a Node B (NodeB or NB), an Evolved NodeB (eNodeB or eNB), a NodeB in new radio access (gNB), a next generation NodeB (gNB), a Remote Radio Unit (RRU), a radio head (RH), a remote radio head (RRH), a low power node such as a femto node, a pico node, and the like. For the purpose of discussion, in the following, some embodiments will be described with reference to eNB as examples of the network device.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, image capture devices such as digital cameras, gaming devices, music storage and playback appliances, or Internet appliances enabling wireless or wired Internet access and browsing and the like.

As used herein, the singular forms "a", "an" and "the" are intended to include the plural forms as well, unless the context clearly indicates otherwise. The term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below.

In some examples, values, procedures, or apparatus are referred to as "best," "lowest," "highest," "minimum," "maximum," or the like. It will be appreciated that such descriptions are intended to indicate that a selection among many used functional alternatives can be made, and such selections need not be better, smaller, higher, or otherwise preferable to other selections.

As discussed above, in V2X communication, a transmitting terminal device may transmit SCI to a receiving terminal device via a sidelink between the transmitting terminal device and the receiving terminal device. The SCI includes information indicating the intended terminal device of the SCI. Upon receiving the SCI, the receiving terminal device receives and decodes the data based on the SCI. Based on the result of the decoding, the receiving terminal device transmits a HARQ feedback to transmitting terminal device. The HARQ feedback also includes information indicating the intended terminal device of the HARQ feedback. Currently, a device identification of the receiving terminal device is included both in the SCI and in the HARQ feedback for indicating the intended terminal device of the SCI and the HARQ feedback.

In some scenarios, a receiving terminal device may receive first SCI from a first transmitting terminal device while the receiving terminal device is receiving second SCI from a second transmitting terminal device.

In some scenarios, a receiving terminal device may receive first SCI from a first transmitting terminal device and second SCI from a second transmitting terminal device, respectively. Correspondingly, the receiving terminal device may transmit a first HARQ feedback to the first transmitting terminal device and a second HARQ feedback to the second transmitting terminal device simultaneously. If the first HARQ feedback and the second HARQ feedback each include the device identification of the receiving terminal device, the first transmitting terminal device cannot determine, based on the device identification of the receiving terminal device, that the first HARQ feedback is intended to the first transmitting terminal device. Likewise, the second transmitting terminal device cannot determine, based on the device identification of the receiving terminal device, the second HARQ feedback is intended to the second transmitting terminal device. In other words, there will occur ambiguity on the interpretation of HARQ feedback at the two transmitting terminal devices.

Currently, it has been proposed to include a device identification of a transmitting terminal device in SCI and HARQ feedback so as to avoid the ambiguity. However, if the device identification of the transmitting terminal device is always included in the SCI, the size of the SCI is excessively great.

In order to at least in part solve above and other potential problems, embodiments of the present disclosure provide a solution for sidelink communication. According to embodiments of the present disclosure, if a receiving terminal device determines that it has only one sidelink with a transmitting terminal device, a device identification of the transmitting terminal device will not be included in SCI and HARQ feedback. In this case, the SCI and the HARQ feedback each include a device identification of the receiving terminal device for identifying the intended recipient of the SCI and the HARQ feedback. Thus, the size of the SCI is reduced.

Figure 1:
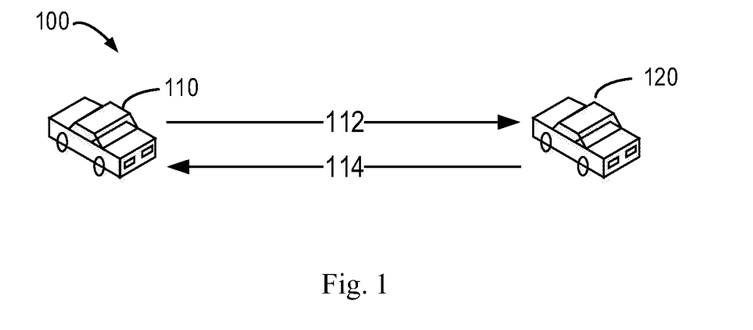
FIG. 1 shows an example communication environment in which embodiments of the present disclosure can be implemented.

FIG. 1 shows an example sidelink communication environment 100 in which example embodiments of the present disclosure can be implemented. The environment 100 includes a terminal device 110 and a terminal device 120. It is to be understood that the number of the terminal devices is only for the purpose of illustration without suggesting any limitations. The environment 100 may include any suitable number of terminal devices adapted for implementing example embodiments of the present disclosure.

The environment 100 illustrates a scenario of V2X communication where vehicles and any other devices can communicate with each other. Communication between terminal devices 110 and 120 can be performed via a sidelink between them.

The terminal device 110 may communicate with the terminal device 120 via a first sidelink between the terminal device 110 and the terminal device 120. For the sidelink communication between the terminal device 110 and the terminal device 120, the terminal device 110 may transmit SCI 112 to the terminal device 120 via the first sidelink. The SCI 112 may include a device identification (ID) of the terminal device 120, indicating the SCI 112 is intended to the terminal device 120. In the context of the present disclosure, for the purpose of discussion, a device ID of a terminal device to which SCI is intended is also referred to as a destination ID of the terminal device, and a device ID of a terminal device from which the SCI is transmitted is also referred to as a source ID of the terminal device. For example, in the example as shown in FIG. 1, the device ID of the terminal device 120 is also referred to as a destination ID of the terminal device 120, and a device ID of the terminal device 110 is also referred to as a source ID of the terminal device 110.

Upon receiving the SCI 112, the terminal device 120 receives and decodes data from the terminal device 110 based on the SCI 112. Based on the result of the decoding, the terminal device 120 transmits a HARQ feedback 114 to the terminal device 110 on a sidelink feedback channel. The HARQ feedback 114 may include the destination ID of the terminal device 120. The terminal device 110 may determine based on the destination ID of the terminal device 120 that the HARQ feedback 114 is intended to the terminal device 110.

Figure 2:
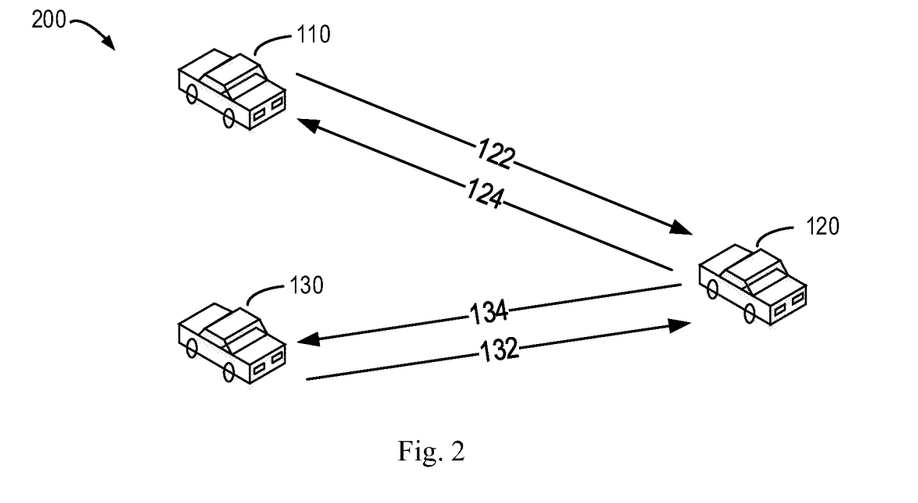
FIG. 2 shows another example communication environment in which embodiments of the present disclosure can be implemented.

FIG. 2 shows another example sidelink communication environment 200 in which example embodiments of the present disclosure can be implemented. Compared with the environment 100 in FIG. 1, the environment 200 further comprises a terminal device 130, in addition to the terminal device 110 and the terminal device 120. In the environment 200, the terminal device 120 may conduct sidelink communications with the terminal device 110 and the terminal device 130 simultaneously. It is to be understood that the number of the terminal devices is only for the purpose of illustration without suggesting any limitations. The communication environment 200 may include any suitable number of terminal devices adapted for implementing example embodiments of the present disclosure.

Similar to the environment 100, the environment 200 also illustrates a scenario of V2X communication where vehicles and any other devices can communicate with each other.

Differing from the example as shown in FIG. 1, in the example as shown in FIG. 2, for the sidelink communication between the terminal device 110 and the terminal device 120, the terminal device 110 may transmit SCI 122 to the terminal device 120 via the first sidelink. The SCI 122 includes the destination ID of the terminal device 120 and a link ID of the first sidelink. Upon receiving the SCI 122, the terminal device 120 receives and decodes data from the terminal device 110 based on the SCI 122. Based on the result of the decoding, the terminal device 120 transmits a HARQ feedback 124 to the terminal device 110 on a sidelink feedback channel. The HARQ feedback 124 includes the destination ID of the terminal device 120 and the link ID of the first sidelink. The terminal device 110 may determine based on the link ID of the first sidelink that the HARQ feedback 124 is intended to the terminal device 110.

For the sidelink communication between the terminal device 130 and the terminal device 120, the terminal device 130 may transmit SCI 132 to the terminal device 120 via a second sidelink therebetween. The SCI 132 includes the destination ID of the terminal device 120 and a link ID of the second sidelink. Upon receiving the SCI 132, the terminal device 120 receives and decodes data from the terminal device 130 based on the SCI 132. Based on the result of the decoding, the terminal device 120 transmits a HARQ feedback 134 to the terminal device 130 on a sidelink feedback channel. The HARQ feedback 134 includes the destination ID of the terminal device 120 and the link ID of the second sidelink. The terminal device 130 may determine based on the link ID of the second sidelink that the HARQ feedback 134 is intended to the terminal device 130.

Depending on the communication technologies, the environments 100 and 200 may be implemented as a Code Division Multiple Access (CDMA) network, a Time Division Multiple Address (TDMA) network, a Frequency Division Multiple Access (FDMA) network, an Orthogonal Frequency-Division Multiple Access (OFDMA) network, a Single Carrier-Frequency Division Multiple Access (SC-FDMA) network or any others. Communications discussed in the environment 100 may use conform to any suitable standards including, but not limited to, New Radio Access (NR), Long Term Evolution (LTE), LTE-Evolution, LTE-Advanced (LTE-A), Wideband Code Division Multiple Access (WCDMA), Code Division Multiple Access (CDMA), cdma2000, and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols. The techniques described herein may be used for the wireless networks and radio technologies mentioned above as well as other wireless networks and radio technologies. For clarity, certain aspects of the techniques are described below for LTE, and LTE terminology is used in much of the description below.

Figure 3:
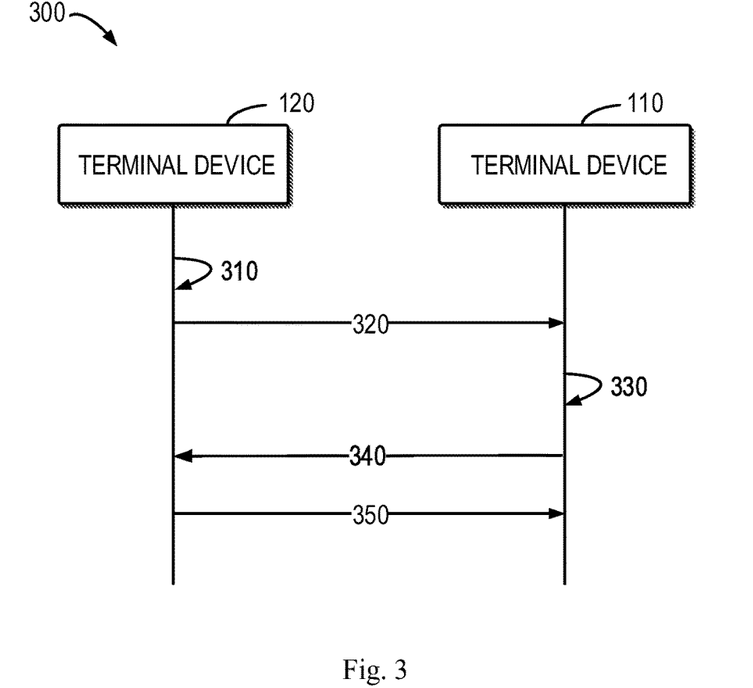
FIG. 3 is a signaling chart of an example process for sidelink communication in accordance with some embodiments of the present disclosure.

Principle and implementations of the present disclosure will be described in detail below with reference to FIG. 3, which is a signaling chart of an example process 300 for sidelink communication in accordance with some embodiments of the present disclosure. The process 300 may involve the terminal devices 110 and 120 as shown in FIG. 1 or the terminal devices 110, 120 and 130 as shown in FIG. 2. It is to be understood that process 300 may include additional acts not shown and/or omit some acts as shown. The scope of the present disclosure is not limited in this respect.

The terminal device 120 determines 310 whether the second sidelink between the terminal device 120 and the terminal device 130 has been established.

Based on the determination 310, the terminal device 120 transmits 320 an indication whether a link ID field is to be included in SCI. In some embodiments, the terminal device 120 may transmit the indication via a higher layer signaling for setup of a unicast session with the terminal device 110. Examples of the higher layer signaling include, but are not limited to, a Radio Resource Control (RRC) layer signaling and a Media Access Control (MAC) layer signaling.

If the terminal device 120 determines that the second sidelink between the terminal device 120 and the terminal device 130 has not been established, the terminal device 120 transmits to the terminal device 110 an indication indicating the link ID field is not to be included in SCI.

On the other hand, if the terminal device 120 determines that the second sidelink between the terminal device 120 and the terminal device 130 has been established, the terminal device 120 transmits to the terminal device 110 an indication indicating the link ID field is to be included in SCI.

Correspondingly, the terminal device 110 receives from the terminal device 120 the indication whether the link ID field is to be included in SCI.

The terminal device 110 determines 330 whether the indication indicates the link ID field is to be included in SCI, or indicates the link ID field is not to be included in SCI.

If the terminal device 110 determines that the indication indicates the link ID field is not to be included in SCI, the terminal device 110 transmits 340 to the terminal device 120 first SCI via the first sidelink between the terminal device 110 and the terminal device 120. The first SCI includes a destination ID of the terminal device 120.

In some embodiments, the destination ID of the terminal device 120 may be a physical layer ID of the terminal device 120. In some embodiments, the physical layer ID of the terminal device 120 may be part of an MAC layer ID of the terminal device 120. For example, the physical layer ID of the terminal device 120 may include a fixed number of Least Significant Bits (LSBs) or a fixed number of Most Significant Bits (MSBs) of the MAC layer ID.

Upon receiving the first SCI, the terminal device 120 receives and decodes data from the terminal device 110 based on the first SCI. Based on the result of the decoding, the terminal device 120 transmits 350 a first HARQ feedback for the first SCI to the terminal device 110. The first HARQ feedback includes the destination ID of the terminal device 120.

Because there is no ongoing sidelink between the terminal device 120 and other terminal devices than the terminal device 110, based on the destination ID of the terminal device 120 in the first HARQ feedback, the terminal device 110 may determine that the first HARQ feedback is intended to the terminal device 110.

In accordance with some embodiments of the present disclosure, in case where the receiving terminal device 120 only has a sidelink with the transmitting terminal device 110, no additional device ID or link ID is included in the SCI from the transmitting terminal device 110. Thus, the size of the SCI is reduced.

Figure 4:
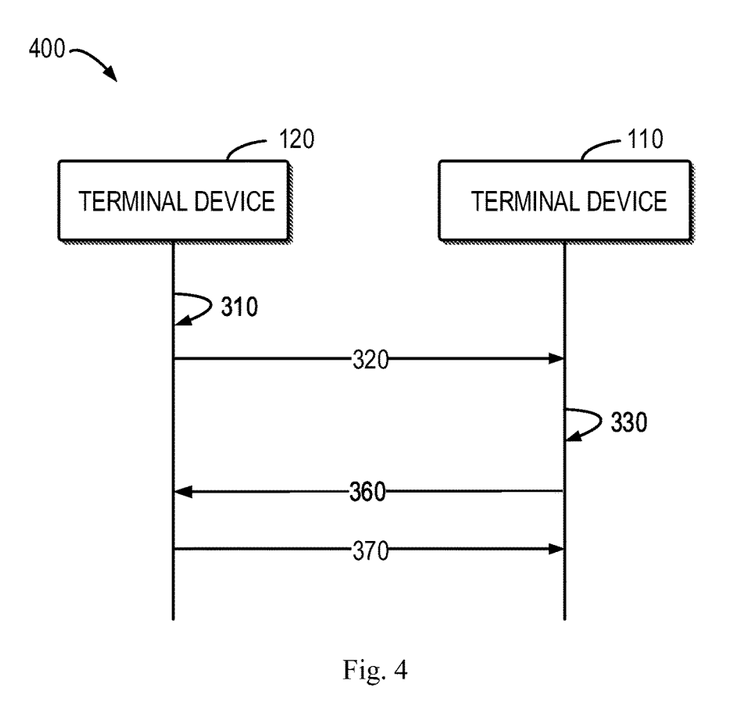
FIG. 4 is a signaling chart of an example process for sidelink communication in accordance with some other embodiments of the present disclosure.

FIG. 4 is a signaling chart of an example process 400 for sidelink communication in accordance with some other embodiments of the present disclosure. The process 400 may involve the terminal devices 110, 120 and 130 as shown in FIG. 2. It is to be understood that process 400 may include additional acts not shown and/or omit some acts as shown. The scope of the present disclosure is not limited in this respect.

The acts 310, 320 and 330 in the process 400 are the same as those in process 300, and thus their detailed descriptions are omitted.

If the terminal device 110 determines that the indication indicates the link ID field is to be included in SCI, the terminal device 110 transmits 360 to the terminal device 120 second SCI via the first sidelink between the terminal device 110 and the terminal device 120. The second SCI includes a link ID of the first sidelink in the link ID field and a destination ID of the terminal device 120. The link ID is different from the destination ID of the terminal device 120.

In some embodiments, the link ID in the second SCI comprises a source ID of the terminal device 110.

In other embodiments, the link ID is different from the source ID of the terminal device 110, and the link ID comprises a link ID that is received from the terminal device 120. In such embodiments, the terminal device 110 may receive the link ID from the terminal device 120 before the terminal device 110 transmits the second SCI to the terminal device 120. In some embodiments, the terminal device 110 may receive the link ID via a higher layer signaling from the terminal device 120. Examples of the higher layer signaling include, but are not limited to, an RRC layer signaling and an MAC layer signaling.

In some embodiments, a length of the link ID in the second SCI may be specified. For example, the length of the link ID may be specified in 3GPP specifications.

In other embodiments, the length of the link ID in the second SCI may be configured. For example, the length of the link ID may be configured by a network device that communicates with the terminal device 120.

In still other embodiments, the length of the link ID in the second SCI may be preconfigured. For example, the length of the link ID may be preconfigured by a network operator with which the terminal device 120 is associated, or preconfigured by transportation departments that manage the terminal device 120.

In some embodiments, the length of the link ID in the second SCI may be less than that of the source ID of the terminal device 110. In this way, the size of the second SCI may be reduced.

With continued reference to FIG. 4, upon receiving the second SCI, the terminal device 120 receives and decodes data from the terminal device 110 based on the second SCI. Based on the result of the decoding, the terminal device 120 transmits 370 a second HARQ feedback for the second SCI to the terminal device 110. The second HARQ feedback includes the link ID that is received in the second SCI, and the destination ID of the terminal device 120.

In accordance with some embodiments of the present disclosure, in case where the receiving terminal device 120 has one or more sidelinks with other transmitting terminal devices than the transmitting terminal device 110, the link ID of the sidelink is used for identifying the sidelink between the receiving terminal device 120 and the transmitting terminal device 110. Based on the link ID in the second HARQ feedback, the terminal device 110 may determine that the second HARQ feedback is intended to the terminal device 110. Thus, ambiguity on the interpretation of HARQ feedback at more transmitting terminal devices may be avoided.

Figure 5:
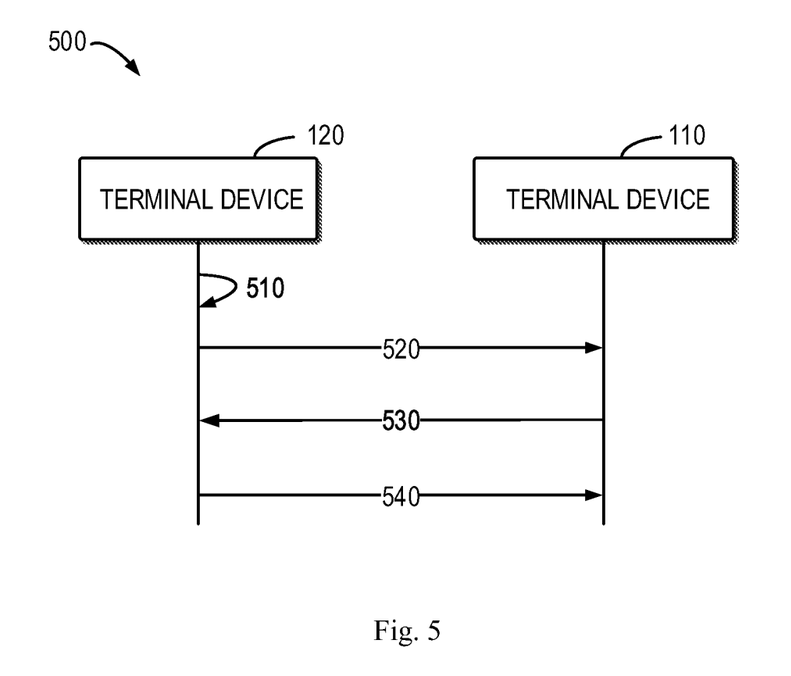
FIG. 5 is a signaling chart of an example process for sidelink communication in accordance with still other embodiments of the present disclosure.

FIG. 5 is a signaling chart of an example process 500 for sidelink communication in accordance with still other embodiments of the present disclosure. The process 500 may involve the terminal devices 110 and 120 as shown in FIG. 1 or the terminal devices 110, 120 and 130 as shown in FIG. 2. It is to be understood that process 500 may include additional acts not shown and/or omit some acts as shown. The scope of the present disclosure is not limited in this respect.

The terminal device 120 determines 510 a link ID of a sidelink between the terminal device 120 and the terminal device 110.

The terminal device 120 transmits 520 the determined link ID to the terminal device 110. In some embodiments, the terminal device 120 may transmit the determined link ID via a higher layer signaling for setup of a unicast session with the terminal device 110. Examples of the higher layer signaling include, but are not limited to, an RRC layer signaling and an MAC layer signaling.

Correspondingly, the terminal device 110 receives the determined link ID from the terminal device 120.

The terminal device 110 transmits 530 SCI to the terminal device 120. The SCI includes the received link ID and a destination ID of the terminal device 120.

Upon receiving the SCI from the terminal device 110, the terminal device 120 receives and decodes data from the terminal device 110 based on the SCI. Based on the result of the decoding, the terminal device 120 transmits 540 a HARQ feedback for the SCI to the terminal device 110. The HARQ feedback includes the link ID that is received in the SCI, and the destination ID of the terminal device 120.

Upon receiving the HARQ feedback from the terminal device 120, based on the link ID in the HARQ feedback, the terminal device 110 may determine that the HARQ feedback is intended to the terminal device 110. Thus, ambiguity on the interpretation of HARQ feedback at more transmitting terminal devices may be avoided.

In some embodiments, a length of the link ID in the SCI may be specified, configured, or preconfigured. In some embodiments, the length of the link ID may be less than that of the source ID of the terminal device 110. In this way, the size of the SCI may be reduced.

In the process 500, the terminal device 120 does not determine whether it has one or more sidelinks with other transmitting terminal devices than the transmitting terminal device 110. Thus, the terminal device 120 does not indicate to the terminal device 110 whether a link ID is to be included in SCI from the terminal device 110. Instead, before establishing a unicast session with any transmitting terminal device, the receiving terminal device 120 transmits a link ID to the transmitting terminal device. Accordingly, SCI from any transmitting terminal device includes the link ID received from the receiving terminal device 120. Thus, SCI from any transmitting terminal device has a fixed size. In this way, the receiving terminal device is not required to make multiple attempts to decode the SCI. Thereby, decoding of the SCI is accelerated.

Figure 6:
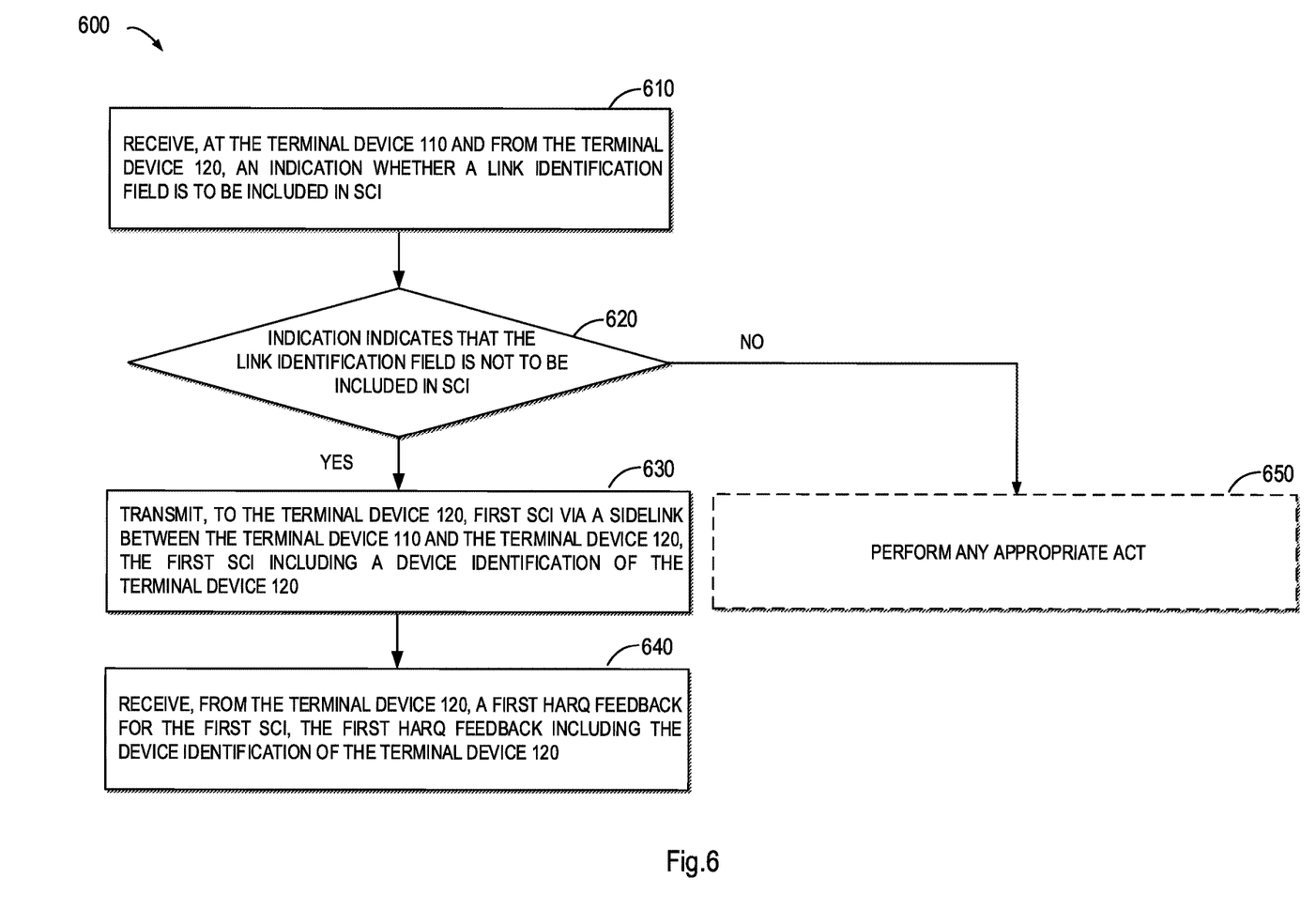
FIG. 6 is a flowchart of a method of sidelink communication in accordance with some embodiments of the present disclosure.

FIG. 6 is a flowchart of a method 600 for sidelink communication in accordance with some embodiments of the present disclosure. For example, the method 600 can be implemented at the terminal device 110 as shown in FIG. 1 or FIG. 2. It is to be understood that the method 600 may include additional blocks not shown and/or may omit some blocks as shown, and the scope of the present disclosure is not limited in this regard.

At block 610, the terminal device 110 receives from the terminal device 120, an indication whether a link identification field is to be included in SCI.

At block 620, the terminal device 110 determines whether the indication indicates that the link identification field is not to be included in the SCI.

If it is determined at block 620 that the indication indicates that the link identification field is not to be included in the SCI, the terminal device 110 transmits at block 630 first SCI to the terminal device 120 via a sidelink between the terminal device 110 and the terminal device 120. The first SCI includes a device identification of the terminal device 120.

At block 640, the terminal device 110 receives, from the terminal device 120, a first HARQ feedback for the first SCI. The first HARQ feedback includes the device identification of the terminal device 120.

On the other hand, if it is determined at block 620 that the indication indicates that the link identification field is to be included in the SCI, the terminal device 110 may perform any appropriate act at block 650.

In some embodiments, if it is determined at block 620 that the indication indicates that the link identification field is to be included in the SCI, the terminal device 110 may transmit second SCI to the terminal device 120 via the sidelink. The second SCI includes a link identification of the sidelink in the link identification field and the device identification of the terminal device 120. The link identification is different from the device identification. In such some embodiments, the terminal device 110 may receive a second HARQ feedback for the second SCI from the terminal device 120. The second HARQ feedback includes the link identification and the device identification of the terminal device 120.

In some embodiments, the link identification comprises a first device identification of the terminal device 110.

In some embodiments, the terminal device 110 may receive the link identification from the terminal device 120. The link identification is different from a first device identification of the terminal device 110.

In some embodiments, the link identification in the second SCI comprises the received link identification.

In some embodiments, a length of the link identification in the second SCI is specified, configured or preconfigured.

Figure 7:
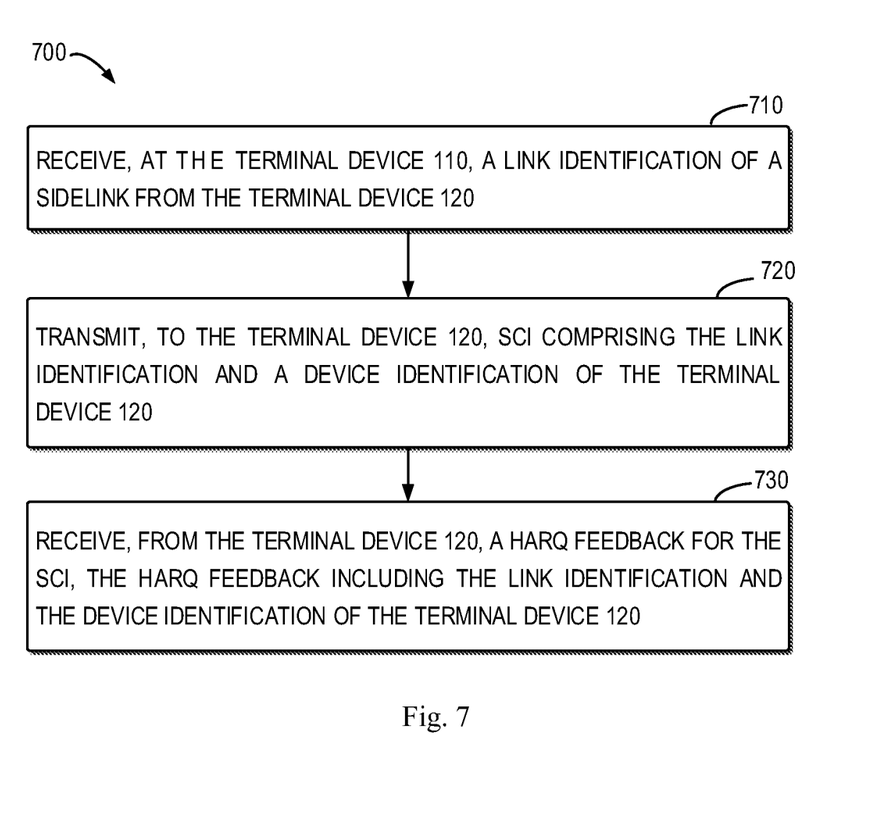
FIG. 7 is a flowchart of a method of sidelink communication in accordance with other embodiments of the present disclosure.

FIG. 7 is a flowchart of a method 700 for sidelink communication in accordance with some embodiments of the present disclosure. For example, the method 700 can be implemented at the terminal device 110 as shown in FIG. 1 or FIG. 2. It is to be understood that the method 700 may include additional blocks not shown and/or may omit some blocks as shown, and the scope of the present disclosure is not limited in this regard.

At block 710, the terminal device 110 receives a link identification of a sidelink from a terminal device 120. The sidelink is between the terminal device 110 and the terminal device 120.

At block 720, the terminal device 110 transmits SCI to the terminal device 120. The SCI includes the link identification and a device identification of the terminal device 120.

At block 730, the terminal device 110 receives, from the terminal device 120, a HARQ feedback for the SCI. The HARQ feedback includes the link identification and the device identification of the terminal device 120.

In some embodiments, a length of the link identification is specified, configured or preconfigured.

Figure 8:
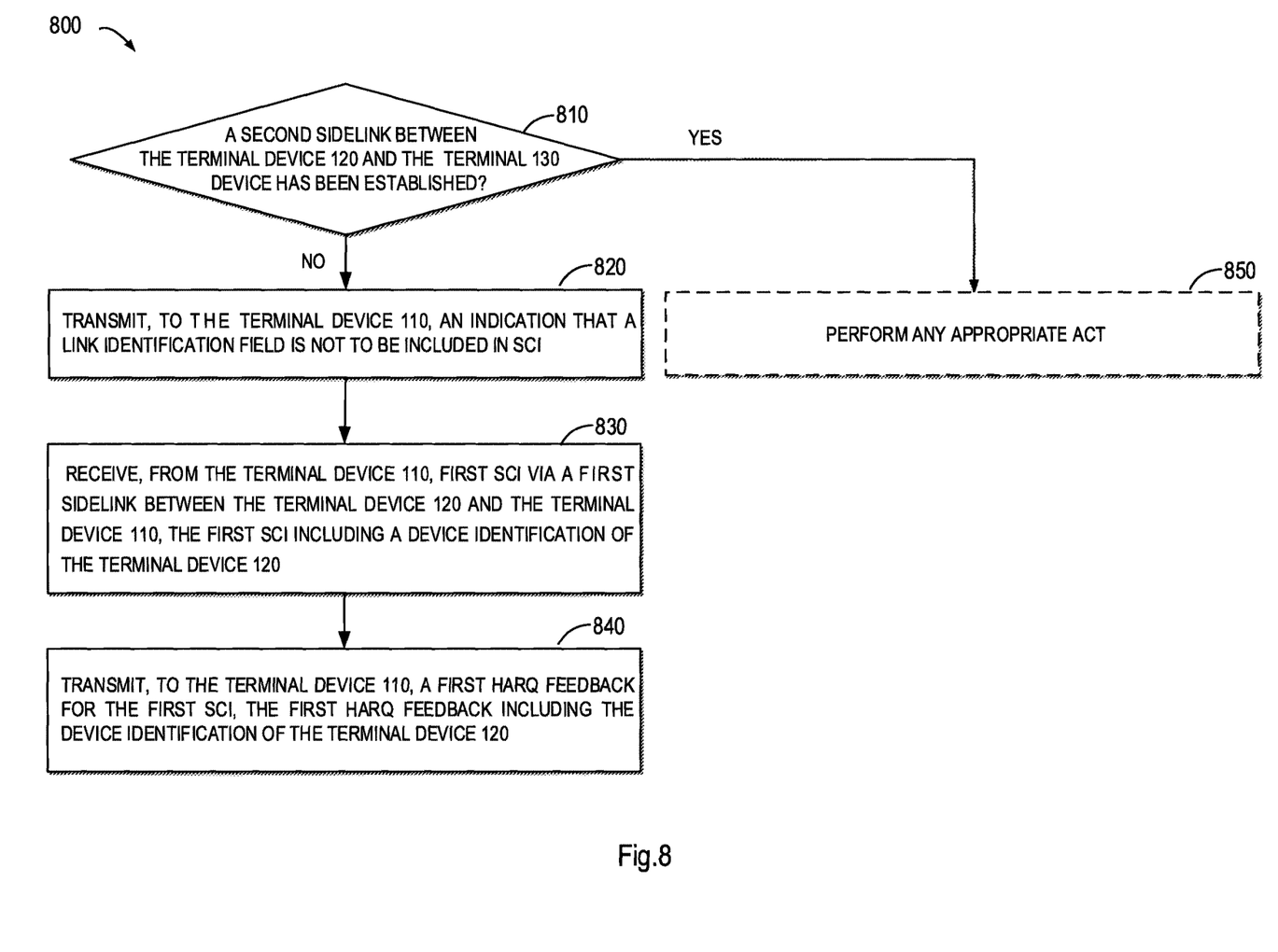
FIG. 8 is a flowchart of a method of sidelink communication in accordance with still other embodiments of the present disclosure.

FIG. 8 is a flowchart of a method 800 for sidelink communication in accordance with some embodiments of the present disclosure. For example, the method 800 can be implemented at the terminal device 120 as shown in FIG. 1 or FIG. 2. It is to be understood that the method 800 may include additional blocks not shown and/or may omit some blocks as shown, and the scope of the present disclosure is not limited in this regard.

At block 810, the terminal device 120 determines whether a second sidelink between the terminal device 120 and the terminal device 130 has been established.

If it is determined at block 810 that the second sidelink has not been established, the terminal device 120 transmits at block 820, to the terminal device 110, an indication that a link identification field is not to be included in SCI.

At block 830, the terminal device 120 receives, from the terminal device 110, first SCI via a first sidelink between the terminal device 120 and the terminal device 110. The first SCI includes a device identification of the terminal device 120.

At block 840, the terminal device 120 transmits, to the terminal device 110, a first HARQ feedback for the first SCI. The first HARQ feedback includes the device identification of the terminal device 120.

On the other hand, if it is determined at block 810 that the second sidelink has been established, the terminal device 120 may perform any appropriate act at block 850.

In some embodiments, if it is determined at block 810 that the second sidelink has been established, the terminal device 120 may transmits, to the terminal device 110, an indication that the link identification field is to be included in the SCI. In such embodiments, the terminal device 120 may receive, from the terminal device 110, second SCI via the first sidelink, the second SCI including a link identification of the first sidelink in the link identification field and the device identification of the terminal device 120. The link identification is different from the device identification of the terminal device 120. The terminal device 120 may further transmit, to the terminal device 110, a second HARQ feedback for the second SCI. The second HARQ feedback includes the link identification and the device identification of the terminal device 120.

In some embodiments, the link identification comprises a device identification of the terminal device 110.

In some embodiments, the terminal device 120 determines the link identification that is different from the device identification of the terminal device 110 and transmits the determined link identification to the terminal device 110.

In some embodiments, the link identification comprises the determined link identification.

Figure 9:
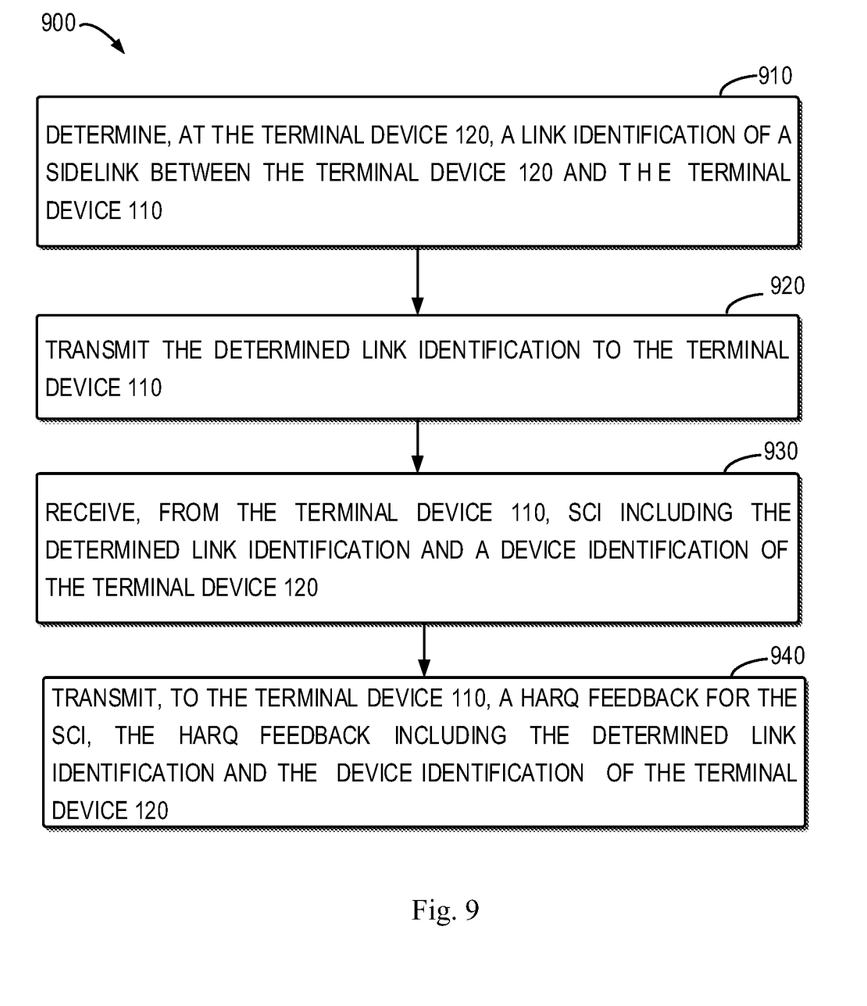
FIG. 9 is a flowchart of a method of sidelink communication in accordance with yet other embodiments of the present disclosure.

FIG. 9 is a flowchart of a method 900 for sidelink communication in accordance with some embodiments of the present disclosure. For example, the method 900 can be implemented at the terminal device 120 as shown in FIG. 1 or FIG. 2. It is to be understood that the method 900 may include additional blocks not shown and/or may omit some blocks as shown, and the scope of the present disclosure is not limited in this regard.

At block 910, the terminal device 120 determines a link identification of a sidelink between the terminal device 120 and the terminal device 110.

At block 920, the terminal device 120 transmits the determined link identification to the terminal device 110.

At block 930, the terminal device 120 receives, from the terminal device 110, SCI including the determined link identification and a device identification of the terminal device 120.

At block 940, the terminal device 120 transmits, to the terminal device 110, a HARQ feedback for the SCI. The HARQ feedback includes the determined link identification and the device identification of the terminal device 120.

In some embodiments, the terminal device 120 determines the link identification having a specified, configured, or preconfigured length.

It should be understood that the aspects and details described with reference to FIGS. 1 to 5 above are also applicable to embodiments as shown in FIGS. 6 to 9. Thus, the description of the aspects and details are repeated.

Figure 10:
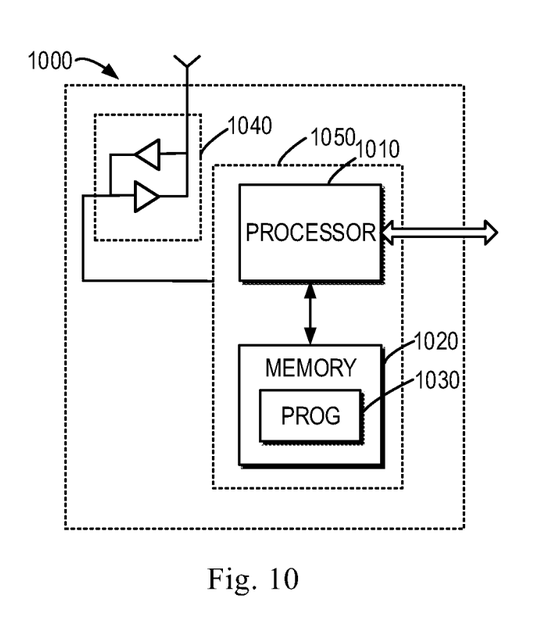
FIG. 10 is a block diagram of a device that is suitable for implementing embodiments of the present disclosure.

FIG. 10 is a simplified block diagram of a device 1000 that is suitable for implementing embodiments of the present disclosure. The device 1000 can be considered as a further example implementation of terminal devices 110 and 120 as shown in FIGS. 1 and 2. Accordingly, the device 1000 can be implemented at or as at least a part of each of the terminal devices 110 and 120.

As shown, the device 1000 includes a processor 1010, a memory 1020 coupled to the processor 1010, a suitable transmitter (TX) and receiver (RX) 1040 coupled to the processor 1010, and a communication interface coupled to the TX/RX 1040. The memory 1010 stores at least a part of a program 1030. The TX/RX 1040 is for bidirectional communications. The TX/RX 1040 has at least one antenna to facilitate communication, though in practice an Access Node mentioned in this application may have several ones. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 1030 is assumed to include program instructions that, when executed by the associated processor 1010, enable the device 1000 to operate in accordance with the embodiments of the present disclosure, as discussed herein with reference to FIGS. 3 to 9. The embodiments herein may be implemented by computer software executable by the processor 1010 of the device 1000, or by hardware, or by a combination of software and hardware. The processor 1010 may be configured to implement various embodiments of the present disclosure. Furthermore, a combination of the processor 1010 and memory 1010 may form processing means 1050 adapted to implement various embodiments of the present disclosure.

The memory 1010 may be of any type suitable to the local technical network and may be implemented using any suitable data storage technology, such as a non-transitory computer readable storage medium, semiconductor-based memory devices, magnetic memory devices and systems, optical memory devices and systems, fixed memory and removable memory, as non-limiting examples. While only one memory 1010 is shown in the device 1000, there may be several physically distinct memory modules in the device 1000. The processor 1010 may be of any type suitable to the local technical network, and may include one or more of general purpose computers, special purpose computers, microprocessors, digital signal processors (DSPs) and processors based on multicore processor architecture, as non-limiting examples. The device 1000 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to any of FIGS. 3 to 9. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method for communications, comprising:
receiving, at a first terminal device and from a second terminal device, an indication whether a link identification field is to be included in sidelink control information; and
in response to a determination that the indication indicates that the link identification field is not to be included in the sidelink control information,
transmitting, to the second terminal device, first sidelink control information via a sidelink between the first terminal device and the second terminal device, the first sidelink control information including a device identification of the second terminal device, and
receiving, from the second terminal device, a first Hybrid Automatic Repeat Request, HARQ, feedback for the first sidelink control information, the first HARQ feedback including the device identification.

2. The method of claim 1, further comprising:
in response to a determination that the indication indicates that the link identification field is to be included in the sidelink control information,
transmitting second sidelink control information to the second terminal device via the sidelink, the second sidelink control information including a link identification of the sidelink in the link identification field and the device identification of the second terminal device, the link identification being different from the device identification, and
receiving, from the second terminal device, a second HARQ feedback for the second sidelink control information, the second HARQ feedback including the link identification and the device identification of the second terminal device.

3. The method of claim 2, wherein the link identification comprises a first device identification of the first terminal device.

4. The method of claim 2, further comprising:
receiving the link identification from the second terminal device, the link identification being different from a first device identification of the first terminal device.

5. The method of claim 4, wherein the link identification in the second sidelink control information comprises the received link identification.

6. The method of claim 2, wherein a length of the link identification in the second sidelink control information is specified, configured or preconfigured.

7. A method for communications, comprising:
receiving, at a first terminal device, a link identification of a sidelink from a second terminal device, the sidelink being between the first terminal device and the second terminal device;
transmitting, to the second terminal device, sidelink control information including the link identification and a device identification of the second terminal device; and
receiving, from the second terminal device, a Hybrid Automatic Repeat Request, HARQ, feedback for the sidelink control information, the HARQ feedback including the link identification and the device identification.

8. The method of claim 7, wherein a length of the link identification is specified, configured or preconfigured.

9. A method for communications, comprising:
determining, at a first terminal device, whether a first sidelink between the first terminal device and a second terminal device has been established;
in response to the determination that the first sidelink has not been established,
transmitting, to a third terminal device, an indication that a link identification field is not to be included in sidelink control information,
receiving, from the third terminal device, first sidelink control information via a second sidelink between the first terminal device and the third terminal device, the first sidelink control information including a first device identification of the first terminal device, and
transmitting, to the third terminal device, a first Hybrid Automatic Repeat Request, HARQ, feedback for the first sidelink control information, the first HARQ feedback including the first device identification.

10. The method of claim 9, further comprising:
in response to the determination that the first sidelink has been established,
transmitting, to the third terminal device, an indication that the link identification field is to be included in the sidelink control information,
receiving, from the third terminal device, second sidelink control information via the second sidelink, the second sidelink control information including a link identification of the second sidelink in the link identification field and the first device identification, the link identification being different from the first device identification, and transmitting, to the third terminal device, a second HARQ feedback for the second sidelink control information, the second HARQ feedback including the link identification and the first device identification.

11. The method of claim 10, wherein the link identification comprises:

a third device identification of the third terminal device.

12. The method of claim 10, further comprising:

determining the link identification that is different from a third device identification of the third terminal device; and transmitting the determined link identification to the third terminal device.

13. The method of claim 12, wherein the link identification comprises the determined link identification.

* * * * *